United States Patent
Okubo et al.

(10) Patent No.: US 6,937,145 B2
(45) Date of Patent: Aug. 30, 2005

(54) TRANSMITTER FOR TIRE CONDITION MONITORING APPARATUS AND THE TIRE CONDITION MONITORING APPARATUS

(75) Inventors: Youichi Okubo, Ogaki (JP); Michiya Katou, Ogaki (JP)

(73) Assignee: Pacific Industrial Co., Ltd. (JP)

( * ) Notice: Subject to any disclaimer, the term of this patent is extended or adjusted under 35 U.S.C. 154(b) by 80 days.

(21) Appl. No.: 10/383,435

(22) Filed: Mar. 7, 2003

(65) Prior Publication Data

US 2003/0193392 A1 Oct. 16, 2003

(30) Foreign Application Priority Data

Apr. 11, 2002 (JP) ........................................ 2002-109537

(51) Int. Cl.$^7$ .............................................. B60C 23/00
(52) U.S. Cl. ...................... 340/447; 340/446; 340/449; 340/426.33; 340/501
(58) Field of Search .................................. 340/447, 446, 340/438, 442, 448, 449, 426.33, 501

(56) References Cited

U.S. PATENT DOCUMENTS

| | | | |
|---|---|---|---|
| 4,376,931 A | * | 3/1983 | Komatu et al. ............. 340/447 |
| 4,489,289 A | | 12/1984 | Slobodnik et al. |
| 5,148,122 A | * | 9/1992 | Karlquist ........................ 331/3 |
| 6,091,343 A | * | 7/2000 | Dykema et al. ........ 340/825.69 |
| 6,092,028 A | * | 7/2000 | Naito et al. .................... 702/47 |
| 6,246,317 B1 | * | 6/2001 | Pickornik et al. ............ 340/447 |
| 6,271,748 B1 | * | 8/2001 | Derbyshire et al. .......... 340/442 |
| 6,340,930 B1 | * | 1/2002 | Lin .............................. 340/447 |

OTHER PUBLICATIONS

European Search Report of Application No. EP 03 00 4564 dated Oct. 3, 2003.

* cited by examiner

Primary Examiner—Jeffery Hofsass
Assistant Examiner—Daniel Previl
(74) Attorney, Agent, or Firm—Caesar, Rivise, Bernstein, Cohen & Pokotilow, Ltd.

(57) ABSTRACT

A transmitter for a tire condition monitoring apparatus is located in a tire of a vehicle and transmits data indicating the tire condition using a carrier wave. The transmitter includes an oscillating circuit and a controller. The oscillating circuit generates a carrier wave frequency and has a predetermined characteristic carrier wave frequency. The controller corrects the generated carrier wave frequency in accordance with the difference between the characteristic carrier wave frequency and a predetermined reference carrier wave frequency.

9 Claims, 3 Drawing Sheets

TRANSMITTER FOR TIRE CONDITION MONITORING APPARATUS AND THE TIRE CONDITION MONITORING APPARATUS

BACKGROUND OF THE INVENTION

The present invention relates to a transmitter for a wireless tire condition monitoring apparatus and to the tire condition monitoring apparatus that allow a driver in a vehicle passenger compartment to check the conditions of vehicle tires, such as air pressure of the tires.

Wireless tire condition monitoring apparatuses for allowing a driver in a vehicle passenger compartment to check the conditions of vehicle tires have been proposed. One such monitoring apparatus includes transmitters and a receiver. Each transmitter is located in one of the wheels and the receiver is located in the vehicle body of the vehicle. Each transmitter detects the conditions such as air pressure and the temperature of the associated tire by, for example, a pressure sensor and a temperature sensor and wirelessly transmits the detection data to the receiver using carrier waves of a predetermined frequency. Thus, each transmitter has a surface acoustic wave (SAW) resonator for generating the carrier waves. The receiver receives the data from the transmitters via a reception antenna and displays the condition of each tire on an indicator located, for example, in front of the driver's seat.

The SAW resonator generally has a frequency deviation of ±300 ppm due to manufacturing tolerance. Therefore, the transmission band of the transmitter tends to vary due to the frequency deviation of the SAW resonator. Accordingly, the reception band of the receiver needs to be widened. However, the receiver having a wide reception band has an increased possibility of receiving signals other than reception signals. Further, the receiving sensitivity could decrease due to deterioration of the signal versus noise ratio. As a result, the transmission data from the transmitter is not easily received accurately.

To solve the above problem, a conventional transmitter uses a high precision SAW resonator having the frequency deviation of ±50 ppm or less. However, the high precision SAW resonator is expensive, which increases the cost of the transmitter.

SUMMARY OF THE INVENTION

Accordingly, it is an objective of the present invention to provide an inexpensive transmitter for a tire condition monitoring apparatus and the tire condition monitoring apparatus that suppress variation of a transmission band.

To achieve the above objective, the present invention provides a transmitter for a tire condition monitoring apparatus. The transmitter is located in a tire of a vehicle and transmits data indicating the tire condition using a carrier wave. The transmitter includes an oscillating circuit and a controller. The oscillating circuit generates a carrier wave frequency and has a predetermined characteristic carrier wave frequency. The controller corrects the generated carrier wave frequency in accordance with the difference between the characteristic carrier wave frequency and a predetermined reference carrier wave frequency.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment of the present invention will now be described with reference to FIGS. 1 to 4.

Figure 1:
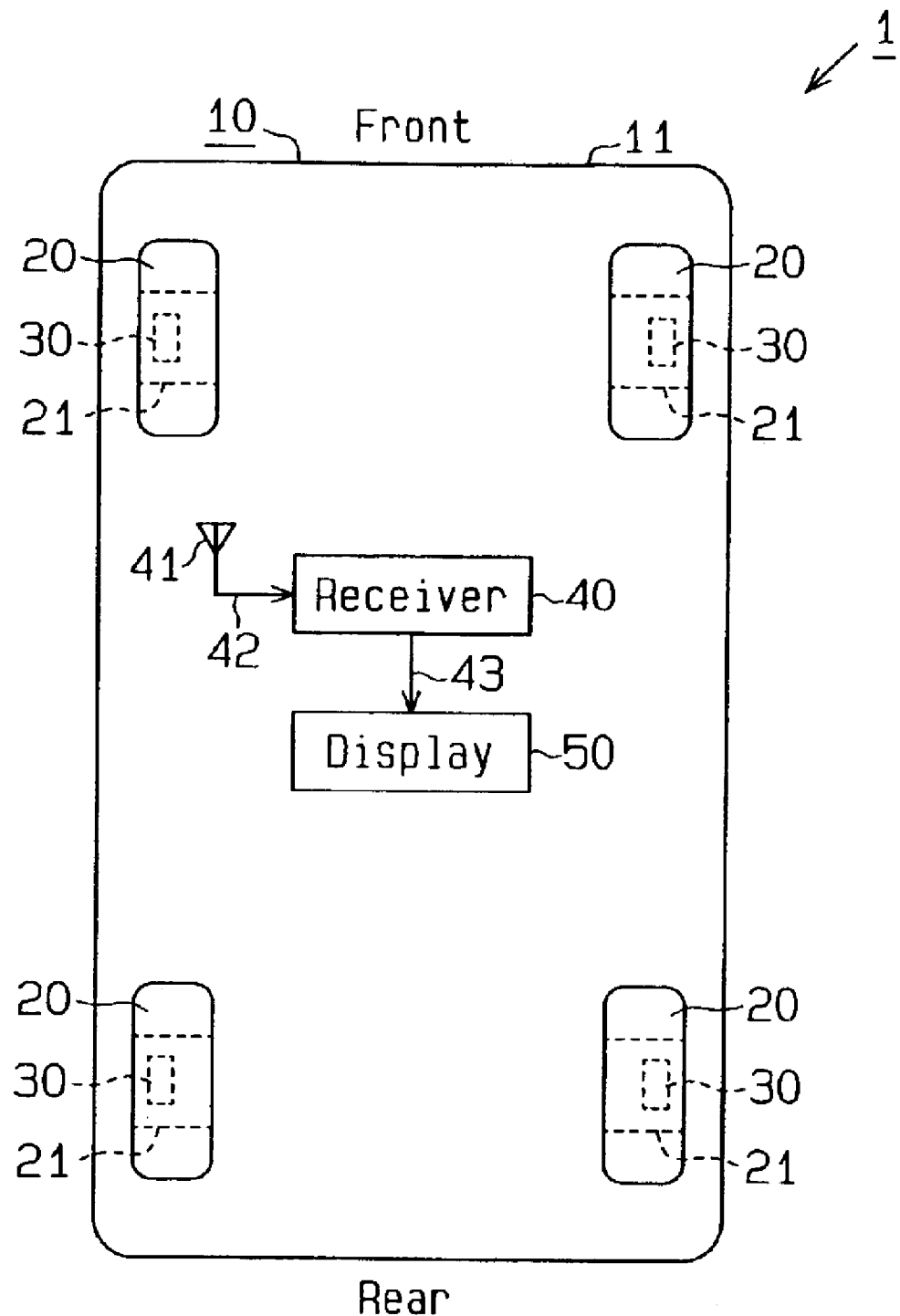
FIG. 1 is a block diagram illustrating a tire condition monitoring apparatus according to one embodiment of the present invention.

As shown in FIG. 1, the tire condition monitoring apparatus 1 includes four tires 20 of a vehicle 10, four transmitters 30, each located in one of the tires 20, and a receiver 40, which is mounted on a vehicle body 11 of the vehicle 10.

Each transmitter 30 is secured to a wheel 21 of the associated tire 20 such that each transmitter 30 is located within the associated tire 20. Each transmitter 30 detects the condition of the associated tire 20, that is, the internal air pressure and the internal temperature of the associated tire 20, and sends data including the air pressure data and the temperature data of the tire 20 using carrier waves of a predetermined frequency.

The receiver 40 is located at a predetermined position of the vehicle body 11 and operates on, for example, power from a battery (not shown) of the vehicle 10. The receiver 40 is connected to a reception antenna 41 via a cable 42. The cable 42 is preferably a coaxial cable, which is less likely to be affected by noise. The receiver 40 receives data transmitted from each transmitter 30 via the reception antenna 41.

An indicator 50 is located in the view of the driver of the vehicle 10. The indicator 50 is connected to the receiver 40 via a cable 43.

Figure 2:
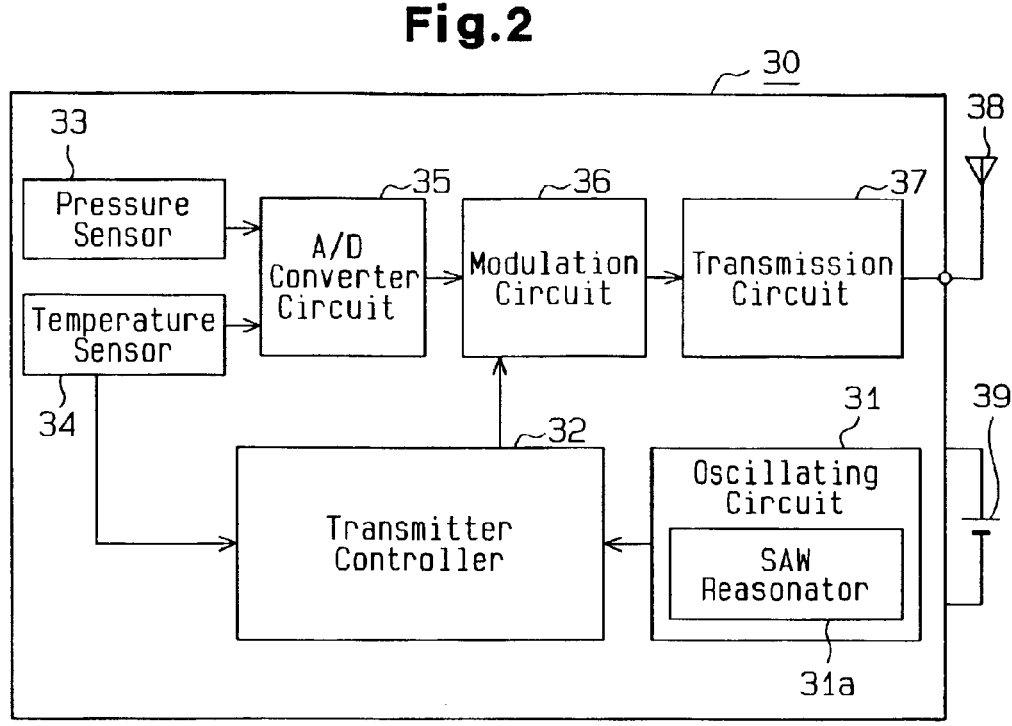
FIG. 2 is a block diagram illustrating a transmitter of the tire condition monitoring apparatus shown in FIG. 1.

As shown in FIG. 2, each transmitter 30 includes an oscillating circuit 31, a transmitter controller 32, an A/D converter circuit 35, a modulation circuit 36, and a transmission circuit 37. Each oscillating circuit 31 includes a SAW resonator 31a, which generates carrier waves of the predetermined frequency. Thus, each oscillating circuit 31 oscillates carrier waves of the predetermined frequency based on the corresponding SAW resonator 31a, and delivers the carrier waves to the corresponding transmitter controller 32, which is, for example, a microcomputer. Each transmitter controller 32 includes, for example, a central processing unit (CPU), a random access memory (RAM), and a read only memory (ROM). A unique ID code is registered in the internal memory, such as ROM, of each transmitter controller 32. The ID code is used to distinguish the associated transmitter 30 from the other three transmitters 30.

The difference between a reference carrier wave frequency and the characteristic carrier wave frequency generated by the SAW resonator 31a, that is, a frequency correction data, is stored in the internal memory of each transmitter controller 32 in advance. For example, if the reference carrier wave frequency is 315 MHz and the characteristic carrier wave frequency of one of the SAW resonators 31a is predetermined to be 315.1 MHz, the frequency correction data is −0.1 MHz.

The characteristic carrier wave frequency of 315.1 MHz corresponds to the carrier wave frequency actually generated by the predetermined SAW resonator 31a when the ambient temperature is at a predetermined reference temperature (for example, the room temperature of 20 degrees Celsius) and is obtained by an experiment beforehand. In other words, although each SAW resonator 31a is designed and manufactured to generate the carrier wave frequency of 315 MHz, which is the reference carrier wave frequency, when the temperature is 20 degrees Celsius, which is the reference temperature, each SAW resonator 31a has a certain degree of frequency deviation due to the manufacturing tolerance. The difference between the characteristic carrier wave frequency (for example, 315.1 MHz) and the reference carrier wave frequency of 315 MHz is mainly caused by the manufacturing tolerance of the SAW resonators 31a. More specifically, the SAW resonator 31a that generates the characteristic carrier wave frequency of 315.1 MHz causes the frequency deviation of approximately 317 ppm with respect to the reference carrier wave frequency of 315 MHz under the temperature of 20 degrees Celsius.

The frequency deviations of the SAW resonators 31a differ from one another. Therefore, the frequency correction data of each SAW resonator 31a may be stored in a predetermined memory, which is not shown, of the corresponding transmitter controller 32 during or after the manufacturing procedure of each transmitter 30. In this case, a data input terminal is preferably provided on each transmitter controller 32.

Figure 3:
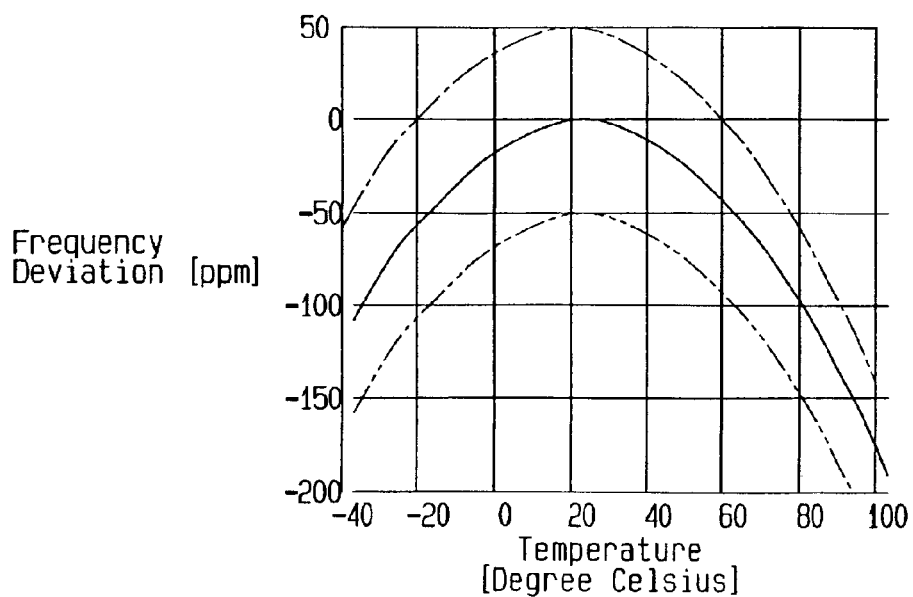
FIG. 3 is a graph showing the temperature characteristic of a SAW resonator.

FIG. 3 is a graph showing the temperature characteristic of the SAW resonators 31a, which generate the carrier wave frequency. The internal memory of each transmitter controller 32 stores the temperature correction data, which is obtained by digitalizing a characteristic line indicated by a solid line in the graph of FIG. 3. The characteristic line represents the temperature characteristic of the SAW resonators 31a, which generate the carrier wave frequency of 315 MHz (or the reference carrier wave frequency) at the reference temperature of 20 degrees Celsius. More specifically, the characteristic line indicates the frequency deviation ppm with respect to 315 MHz on condition that the carrier wave frequency of 315 MHz at the reference temperature corresponds to a reference point zero. As shown by the graph, the characteristic carrier wave frequency generated by each SAW resonator 31a varies in accordance with the temperature.

Characteristic lines indicated by a dashed line and a chain double-dashed line in FIG. 3 represent the temperature characteristic of the SAW resonators 31a, which generate the carrier wave frequency having the frequency deviation of ±50 ppm with respect to the reference carrier wave frequency of 315 MHz under the reference temperature of 20 degrees Celsius. When the characteristic lines are shifted along the vertical axis of the graph, the characteristic lines match with the characteristic line indicated by the solid line. In other words, the temperature characteristic matches with that of the ideal SAW resonator 31a that does not cause any frequency deviation due to the manufacturing tolerance.

As shown in FIG. 2, a pressure sensor 33 located in each tire 20 detects the internal air pressure of the associated tire 20 and sends data representing the detected pressure to the corresponding A/D converter circuit 35. A temperature sensor 34 located in each tire 20 detects the temperature in the associated tire 20 and sends data representing the detected temperature to the corresponding A/D converter circuit 35.

Each transmitter controller 32 corrects the carrier wave frequency received from the corresponding oscillating circuit 31 based on the frequency correction data and the temperature correction data stored in its internal memory, and delivers the corrected carrier wave to the corresponding modulation circuit 36. More specifically, each transmitter controller 32 adds the frequency correction data to the carrier wave frequency received from the corresponding oscillating circuit 31 to cancel the frequency deviation caused by the manufacturing tolerance of the corresponding SAW resonator 31a (a primary correction of the carrier wave frequency). As a result, value of the carrier wave frequency of each oscillating circuit 31 lies on the characteristic line indicated by the solid line in FIG. 3.

Each transmitter controller 32 further corrects the carrier wave frequency that has been through the primary correction in accordance with the temperature data received from the corresponding temperature sensor 34. At this time, each transmitter controller 32 refers to the temperature correction data stored in its internal memory (a secondary correction of the carrier wave frequency). That is, each transmitter controller 32 calculates the frequency deviation of the carrier wave frequency that has been through the primary correction with respect to the reference carrier wave frequency of 315 MHz in accordance with the current temperature inside the associated tire 20. Each transmitter controller 32 then corrects the carrier wave frequency that has been through the primary correction to cancel the frequency deviation. As a result, the carrier wave frequency of the corresponding oscillating circuit 31 matches with the reference carrier wave frequency of 315 MHz.

Each transmitter controller 32 transmits the carrier wave having the carrier wave frequency corrected to 315 MHz to the corresponding modulation circuit 36.

Each A/D converter circuit 35 converts analog signals from the corresponding pressure sensor 33 and the corresponding temperature sensor 34 to digital signals. Each modulation circuit 36 modulates (for example, FM modulation) the air pressure data and the temperature data that are converted into digital signals and the transmission data that includes ID data stored in the internal memory of the corresponding transmitter controller 32 using the carrier wave from the transmitter controller 32. Each transmission circuit 37 wirelessly transmits the modulated transmission data to the receiver 40 via a transmission antenna 38. Each transmitter 30 is provided with a battery 39 and operates on the power from the battery 39.

Figure 4:
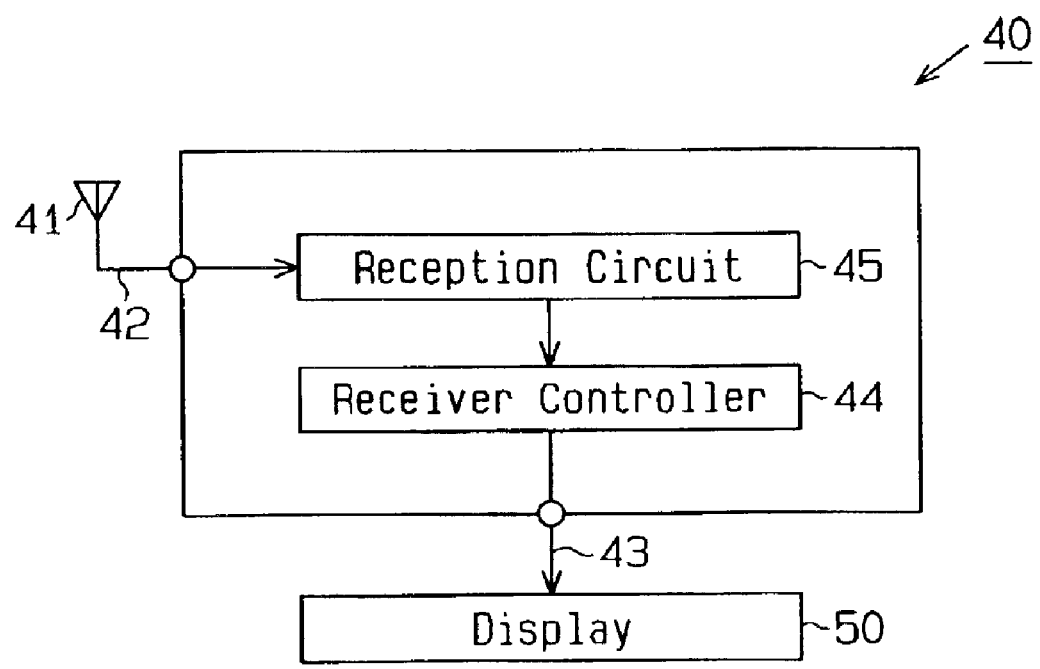
FIG. 4 is a block diagram illustrating a receiver of the tire condition monitoring apparatus shown in FIG. 1.

As shown in FIG. 4, the receiver 40 includes a receiver controller 44 and a reception circuit 45 for processing data received via the reception antenna 41. The receiver controller 44, which is, for example, a microcomputer, includes a CPU, a ROM, a RAM, and the like. The reception circuit 45 receives the transmission data from each transmitter 30 via the reception antenna 41. The reception circuit 45 demodulates and encodes the received data and transmits the data to the receiver controller 44.

The receiver controller 44 detects the air pressure and the temperature of the tire 20 associated with the transmitter 30 that has transmitted the signal based on the received data. The receiver controller 44 displays the data regarding the air pressure and the temperature on the indicator 50. Particularly, the receiver controller 44 displays a warning on the indicator 50 when the air pressure of any of the tires 20 is abnormal. The receiver 40 is activated by, for example, turning on a key switch (not shown) of the vehicle 10.

The operation of each transmitter 30 when transmitting data after detecting the air pressure and the temperature inside the associated tire 20 will be described. The corresponding SAW resonator 31a is assumed to oscillate at the characteristic carrier wave frequency of 315.1 MHz.

The frequency correction data (in this case, −0.1 MHz) stored in the internal memory of each transmitter controller 32 is added to the carrier wave frequency (in this case, 315.1 MHz) sent from the corresponding oscillating circuit 31 so that the carrier wave frequency is in conformity with the reference carrier wave frequency of 315 MHz (the primary correction of the carrier wave frequency). The carrier wave frequency is further corrected based on the internal temperature data of the associated tire 20 detected by the corresponding temperature sensor 34 and the temperature correction data stored in the internal memory of the transmitter controller 32 (the secondary correction of the carrier wave frequency).

When the corrected carrier wave frequency (315 MHz) is sent to the corresponding modulation circuit 36, the air pressure data and the temperature data sent from the corresponding pressure sensor 33 and the corresponding temperature sensor 34, respectively, and the transmission data that includes the ID data sent from the internal memory of the transmitter controller 32 are modulated by the corrected carrier wave frequency. As a result, the modulated transmission data is wirelessly transmitted to the receiver 40 from the corresponding transmission circuit 37 via the transmission antenna 38.

The transmission data from each transmitter 30 is always corrected based on the frequency correction data and the temperature correction data stored in the internal memory of corresponding transmitter controller 32. Thus, the carrier wave frequency from the corresponding oscillating circuit 31 is almost reliably maintained at the reference carrier wave frequency (315 MHz). As a result, the fluctuation of the carrier wave frequency from each oscillating circuit 31 is significantly reduced, and the transmission band of each transmitter 30 does not vary.

Therefore, the reception band of the receiver 40 can be narrowed and signals other than the reception signals are not received as noise. This improves the signal versus noise ratio and prevents receiving sensitivity from being decreased. As a result, the transmission data from each transmitter 30 is accurately received by the receiver 40. Thus, the receiver 40 is only required to receive the reception data that is in the vicinity of the reference carrier wave frequency (315 MHz).

The preferred embodiment provides the following advantages.

The difference between the reference carrier wave frequency and the characteristic carrier wave frequency oscillated from each SAW resonator 31a is stored in the internal memory of the corresponding transmitter controller 32 as the frequency correction data in advance. The temperature correction data, which is obtained by digitalizing the temperature characteristic of the reference carrier wave frequency at the reference temperature, is also stored in the internal memory of the corresponding transmitter controller 32 in advance. The frequency correction data is added to the carrier wave frequency from the corresponding oscillating circuit 31 to correct the carrier wave frequency of the oscillating circuit 31. The carrier wave frequency of each oscillating circuit 31 is further corrected based on the internal temperature data of the associated tire 20 detected by the corresponding temperature sensor 34 and the temperature correction data. As a result, the carrier wave frequency from each oscillating circuit 31 is almost reliably maintained at the reference carrier wave frequency and the fluctuation of the carrier wave frequency is significantly reduced. Thus, the variation of the transmission band of each transmitter 30 is suppressed.

The frequency correction data and the temperature correction data are stored in the internal memory of each transmitter controller 32. Thus, variation of the transmission band is suppressed with a simple structure. Accordingly, the transmitter 30 that has a narrow transmission band is provided at a low cost.

Since the transmission bands of the transmitters 30 are narrowed, the reception band of the receiver 40 can be narrowed. Therefore, signals other than the reception signals are not received as noise. This improves the signal versus noise ratio and the receiving sensitivity. As a result, the transmission data from each transmitter 30 is accurately received by the receiver 40. Thus, the receiver 40 only receives the reception data that is in the vicinity of the reference carrier wave frequency (315 MHz).

It should be apparent to those skilled in the art that the present invention may be embodied in many other specific forms without departing from the spirit or scope of the invention. Particularly, it should be understood that the invention may be embodied in the following forms.

In the case the SAW resonators 31a are used, the frequency deviation of the carrier wave frequency caused by the temperature difference is represented by a negative quadratic function as shown in the graph of FIG. 3. On the assumption that the temperature coefficient of each SAW resonator 31a is α and the temperature detected by the corresponding temperature sensor 34 is θ, the frequency deviation Δf of the carrier wave frequency caused by the temperature difference is represented by the following equation.

$$\Delta f = \alpha(\theta o - \theta max)^2 - \alpha(\theta - \theta max)^2 \quad \text{(equation 1)}$$

In the equation 1, θo represents 25 degrees Celsius and θmax represents the peak temperature of the quadratic function.

The first item in the equation 1 does not include the detected temperature θ of each temperature sensor 34. Thus, the first item in the equation 1 is a constant number. As a result, only the second item of the equation 1 is calculated and subtracted from the first item to obtain the frequency deviation Δf of the carrier wave frequency caused by the temperature difference. The correction equation shown by the equation 1 may be stored in the internal memory of each transmitter controller 32 instead of the temperature correction data, which is obtained by digitalizing the characteristic line shown in FIG. 3, as the data regarding the temperature characteristic of each SAW resonator 31a.

Instead of storing the frequency correction data in the internal memory of each transmitter controller 32, the carrier wave frequency of the corresponding SAW resonator 31a may be corrected by calculating the frequency correction data based on the difference between the reference carrier wave frequency (for example, 315 MHz) and the characteristic carrier wave frequency (for example, 315.1 MHz) oscillated by the SAW resonator 31a.

The SAW resonator 31a may be replaced with a ceramic resonator or a liquid crystal oscillator.

Instead of providing one reception antenna 41 for receiving data from the transmitters 30, four antennas 41 may be provided so that each tire 20 corresponds to one of the antennas 41.

An annunciator may be provided to warn when the air pressure or temperature inside any of the tires 20 is abnormal. In addition, speakers mounted on the vehicle 10 may be designed to serve as annunciators.

The air pressure data transmitted from each transmitter 30 may be either data that specifically represents the value of the air pressure or data that simply indicates whether the air pressure is within a tolerable range.

The vehicle is not limited to a four-wheeled vehicle. The preferred embodiment may be applied to a two-wheeled vehicle, such as a bicycle and a motor bike, or a multi-wheeled vehicle, such as a bus or a towed vehicle, or an industrial vehicle, such as a forklift that has tires 20. When applying the preferred embodiment to a towed vehicle, the receiver 40 and the indicator 50 are located on a tow car.

The temperature sensors 34 may be omitted. In this case, the carrier wave frequency is corrected using only the frequency correction data.

Therefore, the present examples and embodiments are to be considered as illustrative and not restrictive and the invention is not to be limited to the details given herein, but may be modified within the scope and equivalence of the appended claims.

What is claimed is:

1. A transmitter for a tire condition monitoring apparatus, wherein the transmitter is located in a tire of a vehicle and transmits data indicating the tire condition using a carrier wave, the transmitter comprising:

an oscillating circuit, which generates a carrier wave frequency, wherein said oscillating circuit has a predetermined characteristic carrier wave frequency, which corresponds to a carrier wave frequency actually generated by the oscillating circuit when an ambient temperature of the oscillating circuit is at a predetermined reference temperature; and a controller, wherein the controller corrects the generated carrier wave frequency in accordance with the difference between the characteristic carrier wave frequency and a predetermined reference carrier wave frequency.

2. The transmitter according to claim 1, wherein the controller stores in advance, as a correction value, the difference between the characteristic carrier wave frequency and the reference carrier wave frequency.

3. The transmitter according to claim 1, further comprising a temperature sensor for detecting an internal temperature of the tire, wherein the controller corrects the generated carrier wave frequency in accordance with the internal temperature detected by the temperature sensor.

4. The transmitter according to claim 3, wherein the controller stores in advance data indicating a relationship between the generated carrier wave frequency and the temperature of the oscillating circuit.

5. A tire condition monitoring apparatus comprising:

a transmitter located in a tire of a vehicle;

a tire condition sensor for detecting the condition of the tire of the vehicle;

a transmission circuit for transmitting data indicating the tire condition detected by the tire condition sensor using a carrier wave;

an oscillating circuit, which generates a carrier wave frequency, wherein said oscillating circuit has a predetermined characteristic carrier wave frequency, which corresponds to a carrier wave frequency actually generated by the oscillating circuit when an ambient temperature of the oscillating circuit is at a predetermined reference temperature;

a controller, which corrects the generated carrier wave frequency in accordance with the difference between the characteristic carrier wave frequency and a predetermined reference carrier wave frequency; and a receiver located in a vehicle body of the vehicle, wherein the receiver receives data indicating the tire condition transmitted from the transmitter.

6. The tire condition monitoring apparatus according to claim 5, wherein the controller stores in advance, as a correction value, the difference between the characteristic carrier wave frequency and the reference carrier wave frequency.

7. The tire condition monitoring apparatus according to claim 5, wherein the tire condition sensor detects an internal temperature of the tire, and wherein the controller corrects the generated carrier wave frequency in accordance with the internal temperature detected by the tire condition sensor.

8. The tire condition monitoring apparatus according to claim 7, wherein the controller stores in advance data indicating a relationship between the generated carrier wave frequency and the temperature of the oscillating circuit.

9. A transmitter for a tire condition monitoring apparatus, wherein the transmitter is located in a tire of a vehicle and transmits data indicating the tire condition using a carrier wave, the transmitter comprising:

an oscillating circuit, which generates a carrier wave frequency, wherein said oscillating circuit has a predetermined characteristic carrier wave frequency, which corresponds to a carrier wave frequency actually generated by the oscillating circuit when an ambient temperature of the oscillating circuit is at a predetermined reference temperature;

a temperature sensor for detecting the internal temperature of the tire; and a controller, wherein the controller performs a primary correction on the generated carrier wave frequency based on a frequency deviation caused by manufacturing tolerance of the oscillating circuit in accordance with a correction data, the correction data being the difference between the characteristic carrier wave frequency and a predetermined reference carrier wave frequency, and wherein the controller further performs a secondary correction on the generated carrier wave frequency that has been through the primary correction in accordance with the internal temperature detected by the temperature sensor.

* * * * *